(12) United States Patent
Tsuchiya

(10) Patent No.: US 9,441,764 B2
(45) Date of Patent: Sep. 13, 2016

(54) CABLE FASTENER, IMAGE FORMING APPARATUS

(71) Applicant: KYOCERA Document Solutions Inc., Osaka-shi, Osaka (JP)

(72) Inventor: Hiroaki Tsuchiya, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/882,252

(22) Filed: Oct. 13, 2015

(65) Prior Publication Data
US 2016/0109037 A1    Apr. 21, 2016

(30) Foreign Application Priority Data
Oct. 16, 2014    (JP) .................................. 2014-211337

(51) Int. Cl.
*F16L 3/137*    (2006.01)
*G03G 21/16*    (2006.01)
*B65D 63/04*    (2006.01)
*B65D 63/18*    (2006.01)

(52) U.S. Cl.
CPC ............. *F16L 3/137* (2013.01); *B65D 63/04* (2013.01); *B65D 63/18* (2013.01); *G03G 21/1604* (2013.01); *G03G 21/1652* (2013.01); *G03G 21/1666* (2013.01)

(58) Field of Classification Search
CPC ..................... G03G 21/1604; G03G 21/1652; G03G 2221/166; G03G 15/80; F16L 3/137; F16L 3/13; B65D 63/1018; B65D 63/16; B65D 63/18
See application file for complete search history.

(56) References Cited

U.S. PATENT DOCUMENTS

| 169,789 | A | * | 11/1875 | Drake | B65D 63/04 24/20 EE |
| 983,093 | A | * | 1/1911 | Svenson | B65D 63/04 16/16 |
| 2,347,263 | A | * | 4/1944 | Higgins | B63B 23/58 24/572.1 |
| 4,413,383 | A | * | 11/1983 | Spalding | A44B 11/2596 24/164 |
| 5,224,247 | A | * | 7/1993 | Collier | A44B 11/28 24/587.12 |
| 6,209,827 | B1 | * | 4/2001 | Kawai | F16B 21/02 248/49 |
| 8,225,468 | B2 | * | 7/2012 | Wanzenboeck | A41F 1/006 24/586.11 |

(Continued)

FOREIGN PATENT DOCUMENTS

EP    1179878 A2    2/2002
JP    2980587 B1    9/1999

OTHER PUBLICATIONS

European Patent Office, Extended European Search Report Issued in Application No. 15189833.5, Mar. 7, 2016, Germany, 7 pages.

*Primary Examiner* — David Gray
*Assistant Examiner* — Laura Roth
(74) *Attorney, Agent, or Firm* — Alleman Hall McCoy Russell & Tuttle LLP

(57) ABSTRACT

In a cable fastener, a fixing portion is a projection projecting from a second surface of a base portion that is opposite to a first surface for supporting a cable, and when the fixing portion is inserted into a hole of a plate-like support portion and then the base portion is rotated, fixes the base portion to the plate-like support portion. Two cable holding portions extend from the base portion toward opposite sides of the base portion, and are configured to be bendingly deformed toward the first surface of the base portion. Two engaging portions are configured to be engaged with each other such that the base portion and the two cable holding portions are kept to be in an annular state.

6 Claims, 6 Drawing Sheets

(56) References Cited

U.S. PATENT DOCUMENTS

| | | | |
|---|---|---|---|
| 8,636,452 B2* | 1/2014 | Summer | B26D 3/001 410/101 |
| D739,785 S * | 9/2015 | Fildan | D11/218 |
| 2002/0060275 A1* | 5/2002 | Polad | F16L 3/137 248/74.3 |
| 2010/0258685 A1* | 10/2010 | Gardner | F16L 3/13 248/68.1 |
| 2011/0048792 A1 | 3/2011 | Masaka | |
| 2011/0242570 A1* | 10/2011 | Miyanagi | G03G 15/04036 358/1.13 |
| 2014/0292927 A1* | 10/2014 | Tanaka | B41J 29/02 347/39 |

* cited by examiner

CABLE FASTENER, IMAGE FORMING APPARATUS

INCORPORATION BY REFERENCE

This application is based upon and claims the benefit of priority from the corresponding Japanese Patent Application No. 2014-211337 filed on Oct. 16, 2014, the entire contents of which are incorporated herein by reference.

BACKGROUND

The present disclosure relates to a cable fastener for fixing a cable to a plate-like support portion, and to an image forming apparatus including the same.

In general, electric equipment such as an image forming apparatus includes cable fasteners for fixing various types of cables to plate-like support portions.

In general, the cable fasteners are synthetic resin molded members, and each include a base portion, a fixing portion, and a cable holding portion. The base portion has a support surface for supporting the cable thereon. The fixing portion is configured to fix the base portion to a plate-like support portion by being inserted into an attachment hole of the plate-like support portion. The fixing portion is a projection projecting from an attachment surface of the base portion opposite to the support surface. The cable holding portion is configured to hold the cable between the cable holding portion itself and the base portion.

When the cable fastener is attached to the plate-like support portion, the base portion or the fixing portion is elastically deformed, and the fixing portion fixes the base portion to the plate-like support portion in a state where an edge portion of the attachment hole of the plate-like support portion is sandwiched between the fixing portion and the base portion.

SUMMARY

A cable fastener according to an aspect of the present disclosure includes a base portion, a fixing portion, two cable holding portions, and two engaging portions. The base portion has a first surface for supporting a cable. The fixing portion is a projection projecting from a second surface of the base portion that is opposite to the first surface. The fixing portion is configured to, when the fixing portion is inserted into a hole of a plate-like support portion and then the base portion is rotated around a predetermined reference point, fix the base portion to the plate-like support portion in a state where an edge portion of the hole of the plate-like support portion is sandwiched between the fixing portion and the base portion. The two cable holding portions extend from the base portion toward opposite sides of the base portion along a first direction, and are configured to be bendingly deformed toward the first surface of the base portion. The two engaging portions continue to the two cable holding portions respectively from sides opposite to the base portion, and are configured to be engaged with each other such that the base portion and the two cable holding portions are kept to be in an annular state.

An image forming apparatus according to another aspect of the present disclosure includes a photoconductor, at least one optical scanning portion, a developing portion, the cable fastener according to the aspect of the present disclosure, the plate-like support portion, and a cable. The optical scanning portion is configured to write an electrostatic latent image on the photoconductor by scanning the photoconductor with a laser beam. The developing portion is configured to develop the electrostatic latent image by supplying developer to the photoconductor. The plate-like support portion has the hole into which the fixing portion of the cable fastener is inserted such that the base portion of the cable fastener is fixed to the plate-like support portion. The cable is held between the base portion and the two cable holding portions of the cable fastener.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the attached drawings. It should be noted that the following description is an example of a specific embodiment of the present disclosure and should not limit the technical scope of the present disclosure.

Outlined Configuration of Image Forming Apparatus

Figure 1:
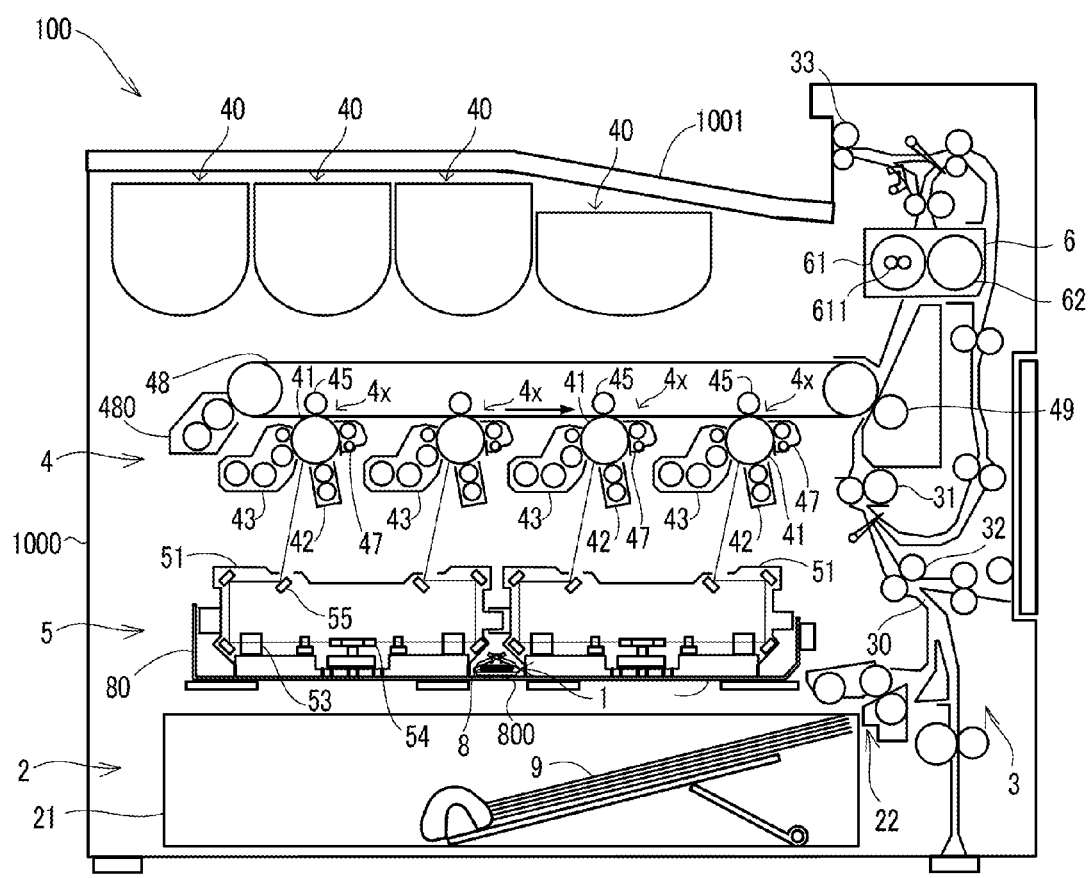
FIG. 1 is a configuration diagram of an image forming apparatus including cable fasteners according to an embodiment of the present disclosure.
Figure 2:
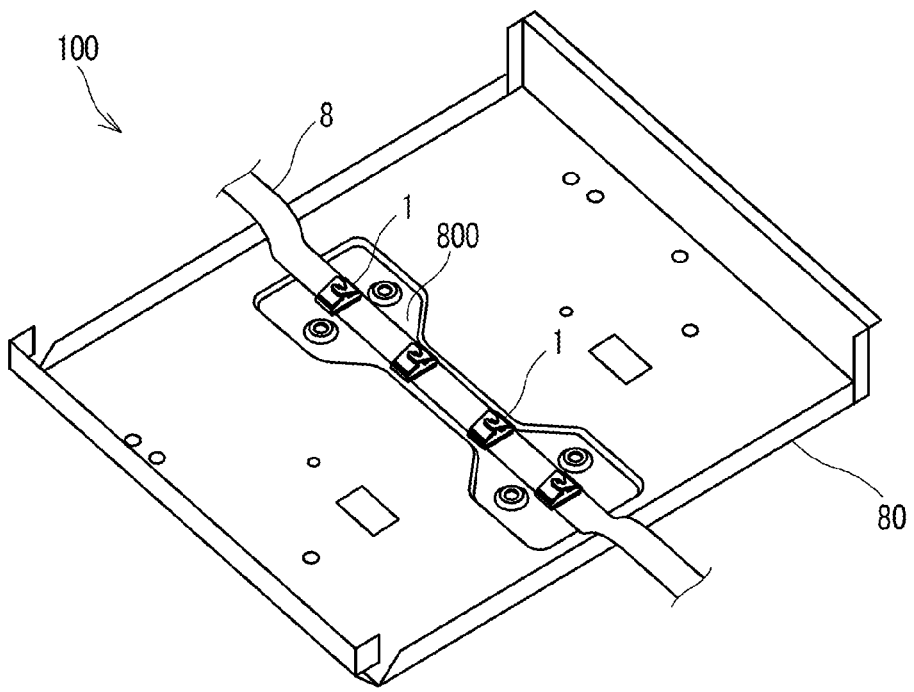
FIG. 2 is a perspective view of a support body of an optical scanning unit to which the cable fasteners according to an embodiment of the present disclosure are fixed.

First, a description is given of the configuration of an image forming apparatus 100 that includes cable fasteners 1 according to an embodiment of the present disclosure with reference to FIGS. 1 and 2. The image forming apparatus 100 is an electrophotographic image forming apparatus.

As shown in FIG. 1, the image forming apparatus 100 includes, in a housing 1000, a sheet supply portion 2, a sheet conveying portion 3, developer replenishing portions 40, an image forming portion 4, an optical scanning unit 5, and a fixing portion 6. Furthermore, the image forming apparatus 100 includes a cable 8 and the cable fasteners 1 for fixing the cable 8 to a support body 80.

The image forming apparatus 100 shown in FIG. 1 is a tandem image forming apparatus and is a color printer. As a result, the image forming portion 4 further includes an intermediate transfer belt 48, a secondary cleaning device 480, and a secondary transfer portion 49. It is noted that the image forming apparatus 100 may be a copier, a facsimile, or a multifunction peripheral. The multifunction peripheral has a function of the printer, a function of the copier, and the like.

The image forming portion 4 includes a plurality of single-color image forming portions 4x that respectively correspond to the colors of cyan, magenta, yellow, and black. Furthermore, the image forming apparatus 100 includes a plurality of developer replenishing portions 40 that supply developer of the colors cyan, magenta, yellow, and black respectively to a plurality of developing portions 43 that are described below.

The sheet supply portion 2 includes a sheet receiving portion 21 and a sheet feed portion 22. The sheet receiving portion 21 is configured to store a plurality of recording sheets 9 stacked therein. It is noted that the recording sheet 9 is a sheet-like image formation medium such as a sheet of paper, a sheet of coated paper, a postcard, an envelope, or an OHP sheet.

The sheet feed portion 22 is configured to feed a recording sheet 9 from the sheet receiving portion 21 to a conveyance path 30, by rotating while in contact with the recording sheet 9.

The sheet conveyance portion 3 includes a registration roller 31, a conveyance roller 32, and a discharge roller 33. The registration roller 31 and the conveyance roller 32 convey the recording sheet 9 supplied from the sheet supply portion 2, to the secondary transfer portion 49 of the image forming portion 4. Furthermore, the discharge roller 33 discharges the recording sheet 9 after image formation, onto a discharge tray 1001 from a discharge port of the conveyance path 30.

Each of the single-color image forming portions 4x includes a drum-like photoconductor 41, a charging portion 42, a developing portion 43, a primary transfer portion 45, and a primary cleaning portion 47. The photoconductor 41 is a member on which an electrostatic latent image is written with a laser beam, and is an example of the image carrier that carries a toner image while rotating. Each of the photoconductors 41 may be, for example, an organic photoconductor or an amorphous silicon photoconductor.

The photoconductor 41 rotates and the charging portion 42 uniformly charges the surface of the photoconductor 41. Furthermore, an optical scanning portion 51 provided in the optical scanning unit 5 writes an electrostatic latent image on the charged surface of the photoconductor 41 by scanning a laser beam thereon. Furthermore, the developing portion 43 supplies the developer to the photoconductor 41 such that the electrostatic latent image is developed into an image of the developer. It is noted that the developer is supplied from the developer replenishing portion 40 to the developing portion 43.

In addition, the primary transfer portion 45 transfers the image of the developer from the surface of the photoconductor 41 to the intermediate transfer belt 48. Furthermore, the primary cleaning portion 47 removes the residual developer from the surface of the photoconductor 41.

The intermediate transfer belt 48 is an endless belt-like member formed in the shape of a loop. The intermediate transfer belt 48 rotates in the state where it is suspended between two rollers. In the image forming portion 4, the single-color image forming portions 4x form images of respective colors on the surface of the rotating intermediate transfer belt 48. With this operation, the images of different colors are overlaid and a color image is formed on the intermediate transfer belt 48.

The secondary transfer portion 49 transfers the image of the developer formed on the intermediate transfer belt 48 to the recording sheet 9. The secondary cleaning device 480 removes developer that remains after the transfer by the secondary transfer portion 49, from the intermediate transfer belt 48.

The fixing portion 6 nips the recording sheet 9 with an image formed thereon, between a heating roller 61, in which is embedded a heater 611, and a pressure roller 62 and feeds the sheet to a downstream process. In this operation, the fixing portion 6 heats the developer on the recording sheet 9 and fixes the image to the recording sheet 9.

In the present embodiment, the optical scanning unit 5 includes two optical scanning portions 51 and a support body 80 that supports the optical scanning portions 51 in a state where they are arranged side by side. Each of the two optical scanning portions 51 outputs laser beams for writing electrostatic latent images on two photoconductors 41 respectively.

Each of the optical scanning portions 51 includes a laser light source 53, a polygon mirror 54, and an optical system 55 that includes another mirror and the like. The laser light source 53 emits a laser beam, the polygon mirror 54 scans the laser beam emitted from the laser light source 53, and the optical system 55 guides the scanned laser beam to the surface of the photoconductor 41.

As shown in FIG. 2, the support body 80 is a plate-like metal member formed by a bending process. In addition, the cable 8 is wired so as to cross over the support body 80. In the example shown in FIG. 2, the cable 8 is a flat cable.

As shown in FIGS. 1 and 2, the cable fasteners 1 are fixed to a plate-like portion of the support body 80, wherein the plate-like portion is opposed to a gap that is formed in a boundary region between the two optical scanning portions 51. Hereinafter, the portion to which the cable fasteners 1 are fixed, namely the plate-like portion that supports the cable 8 via the cable fasteners 1, is referred to as a plate-like support portion 800.

As described below, the cable fasteners 1 are synthetic resin molded members. Each of the cable fasteners 1 includes a base portion 11, fixing portions 10, and cable holding portions 12, wherein the base portion 11 has a support surface 1101, and the fixing portions 10 and the cable holding portions 12 respectively continue to the base portion 11 (see FIGS. 3, 4). The fixing portions 10 are configured to fix the base portion 11 to the plate-like support portion 800 by being inserted into attachment holes 81 of the plate-like support portion 800.

Meanwhile, one method for increasing the holding force of the cable fasteners 1 against the plate-like support portion 800 is to increase the rigidity of the base portion 11 and the fixing portions 10. However, in conventional cable fasteners, when the rigidity of the base portion and the fixing portions is high, a large force is required to elastically deform the base portion and the fixing portions.

As a result, to increase the holding force of the conventional cable fasteners against the plate-like support portion 800, a large force is required to attach the cable fasteners to the plate-like support portion 800. This deteriorates the workability of the attachment of the cable fasteners.

In addition, there is known another conventional configuration in which the cable fasteners are placed to stand high on the plate-like support portion 800 so that the worker can easily grip and apply a force to the cable fasteners. However, if this configuration is adopted, the cable fasteners are difficult to be stored in the limited space.

On the other hand, adoption of the cable fasteners 1 makes it possible to reduce the load required for attaching the cable fasteners to the plate-like support portion 800, and adopt a configuration where the holding force of the cable fasteners against the plate-like support portion 800 is high and the cable fasteners have a short height.

Cable Fasteners

Figure 3:
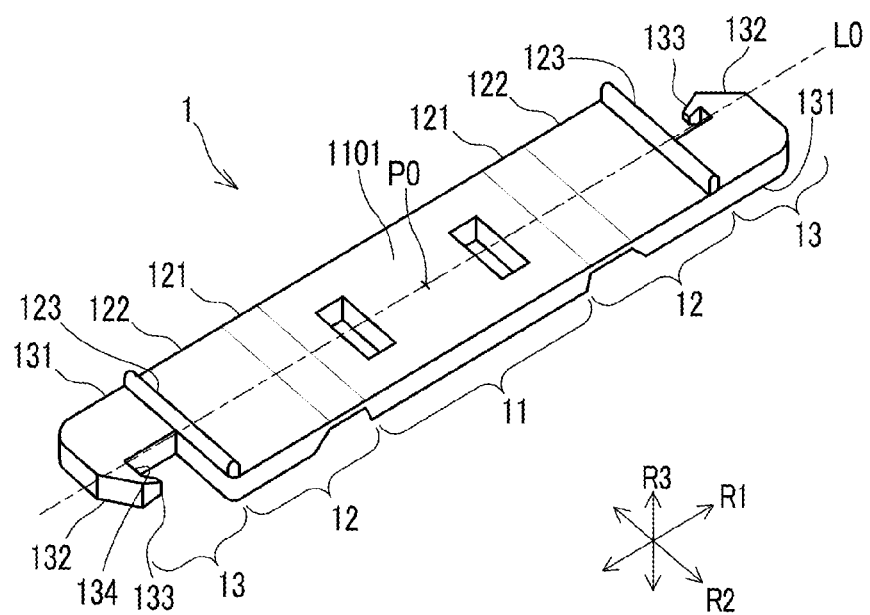
FIG. 3 is a first perspective view of the cable fastener according to an embodiment of the present disclosure.
Figure 4:
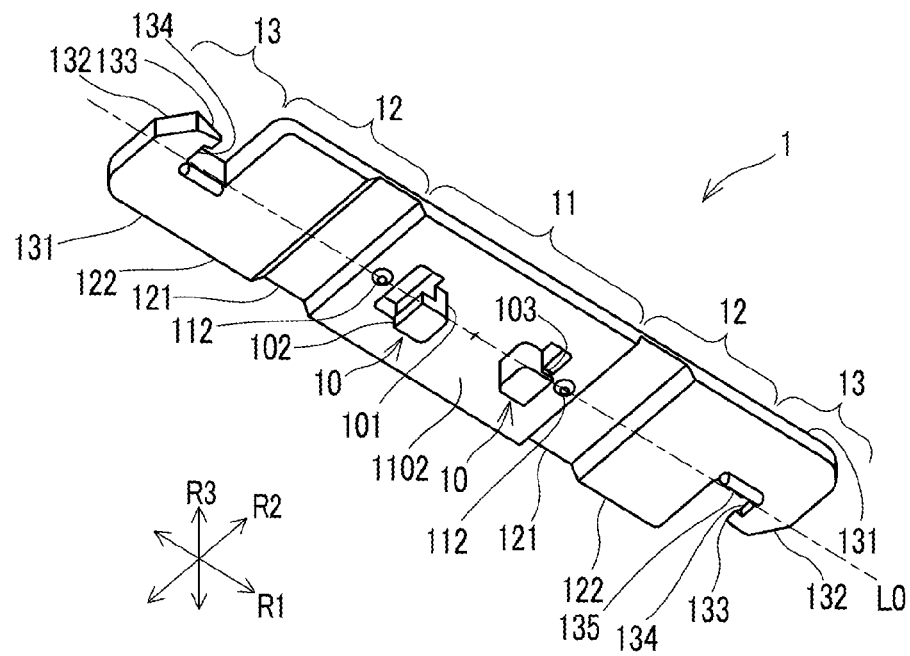
FIG. 4 is a second perspective view of the cable fastener according to an embodiment of the present disclosure.
Figure 5:
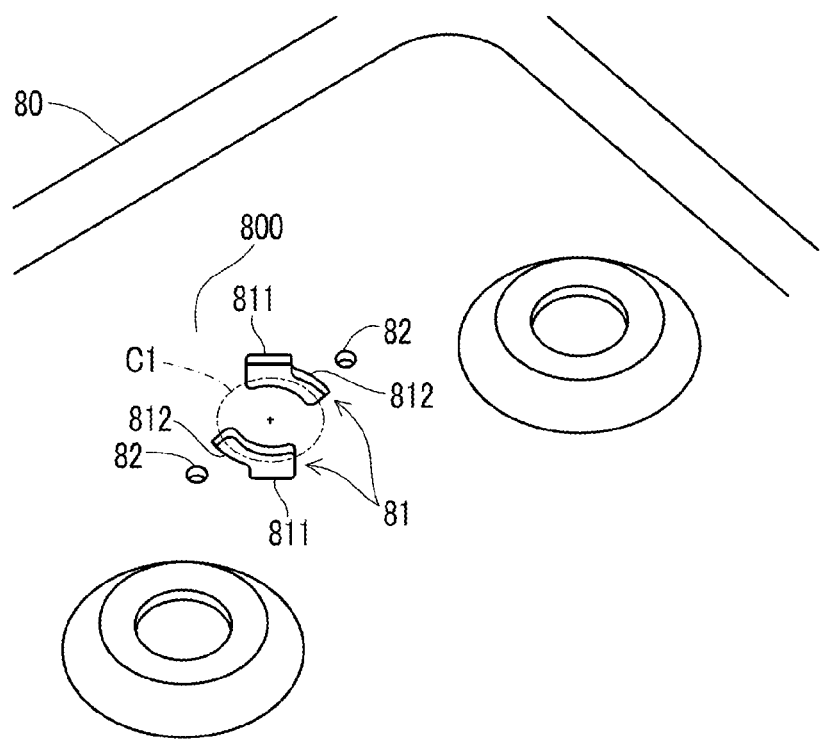
FIG. 5 is a perspective view of the support body provided with an attachment hole into which the cable fastener according to an embodiment of the present disclosure is inserted.

Next, the cable fasteners 1 are described in detail with reference to FIGS. 3-5. FIG. 3 is a perspective view of the cable fastener 1, as viewed from one side thereof. FIG. 4 is a perspective view of the cable fastener 1, as viewed from another side thereof. FIG. 5 is a perspective view of the support body 80 in which the attachment holes are formed such that the cable fasteners 1 can be attached thereto.

The cable fasteners 1 are synthetic resin molded members made of a synthetic resin such as polypropylene, polyethylene, polyvinyl chloride, polybutylene terephthalate, or polyamide.

As shown in FIGS. 3 and 4, each of the cable fasteners 1 includes the base portion 11, the fixing portions 10, two cable holding portions 12, and two engaging portions 13. The support surface 1101 for supporting the cable 8 is formed on the base portion 11. Hereinafter, a surface of the base portion 11 opposite to the support surface 1101 is referred to as an attachment surface 1102.

The fixing portions 10 are projections projecting from the attachment surface 1102 of the base portion 11. In addition, fitting projection portions 112 that are projections projecting from the attachment surface 1102 of the base portion 11 and having a shorter height than the fixing portions 10 are formed on the side of the fixing portions 10.

In addition, as shown in FIG. 5, the attachment holes 81 and fitting holes 82 are formed in the plate-like support portion 800. The attachment holes 81 are through holes into which the fixing portions 10 of the cable fasteners 1 are inserted. The fitting holes 82 are holes in which the fitting projection portions 112 of the cable fasteners 1 are fitted.

Each of the cable fasteners 1 includes two fixing portions 10. As a result, two attachment holes 81 are formed in each area of the plate-like support portion 800 to which one cable fastener 1 is attached. The two fixing portions 10 are projections projecting from the attachment surface 1102 of the base portion 11 at positions close to the two cable holding portions 12 respectively.

Furthermore, each of the cable fasteners 1 includes two fitting projection portions 112. As a result, two fitting holes 82 are formed in each area of the plate-like support portion 800 to which one cable fastener 1 is attached.

Each of the attachment holes 81 is composed of a large-width hole portion 811 and a small-width hole portion 812 that continue to each other, wherein the width of the large-width hole portion 811 is relatively large and the small-width hole portion 812 is smaller in width than the large-width hole portion 811. In each of the two attachment holes 81, the small-width hole portion 812 and a portion of the large-width hole portion 811 continuing to the small-width hole portion 812 are formed along a circle C1. In addition, the two fitting holes 82 are formed outside the circle C1.

The fixing portions 10 are configured to, by being inserted into the attachment holes 81 of the plate-like support portion 800, fix the base portion 11 to the plate-like support portion 800 in the state where the edge portions of the attachment holes 81 of the plate-like support portion 800 are sandwiched between the fixing portions 10 and the base portion 11. In the image forming apparatus 100, the base portion 11 of the cable fastener 1 is fixed to the plate-like support portion 800 by the fixing portions 10.

Each of the fixing portions 10 includes a raised portion 101 and an extension portion 102. The raised portion 101 is a portion that has been raised from the attachment surface 1102 of the base portion 11. The extension portion 102 is a portion formed to extend sidewardly from the raised portion 101.

After the fixing portions 10 are inserted into the attachment holes 81 of the plate-like support portion 800, the base portion 11 is rotated around a reference point P0. This allows the edge portions of the attachment holes 81 to be sandwiched between the fixing portions 10 and the base portion 11. More specifically, the edge portions of the attachment holes 81 are sandwiched between the extension portions 102 of the fixing portions 10 and the base portion 11.

Furthermore, when the fitting projection portions 112 of the cable fastener 1 are fitted in the fitting holes 82 of the plate-like support portion 800, the rotation of the cable fastener 1 is restricted. The fitting configuration of the fitting projection portions 112 and the fitting holes 82 prevents the cable fastener 1 from rotating in a reverse direction to a rotation direction of the attachment, and thereby prevents the cable fastener 1 from removing from the plate-like support portion 800. Details of the configuration where the fixing portions 10 are fixed to the plate-like support portion 800 are described below.

In FIGS. 3 and 4, three arrows indicate three directions. Among these, a first direction R1 and a second direction R2 represent two directions that are perpendicular to each other and extend along the support surface 1101 of the base portion 11. In addition, a third direction R3 represents a direction perpendicular to the first direction R1 and the second direction R2.

In the example shown in FIG. 3, the reference point P0 is a center point of the first direction R1 and the second direction R2.

The cable holding portions 12 extend from the base portion 11 toward opposite sides of the base portion 11 along the first direction R1. The cable holding portions 12 can be bent toward the support surface 1101 side of the base portion 11. However, the cable holding portions 12 are difficult to be bent in the second direction R2. That is, in the cable holding portions 12, the rigidity against an external force applied along the second direction R2 is higher than the rigidity against an external force applied along the third direction R3.

In the example shown in FIGS. 3 and 4, opposite two portions that are each composed of one of the two cable holding portions 12 and one of the two engaging portions 13 continuing to each other have the same length in the first direction R1. It is noted that the same length includes an approximately same length.

The two engaging portions 13 are configured to be engaged with each other such that the base portion 11 and the two cable holding portions 12 are kept to be in an annular state. The two engaging portions 13 continue to the cable holding portions 12 respectively from the sides opposite to the base portion 11.

In the example shown in FIGS. 3 and 4, the base portion 11 is formed like a plate. In addition, each of the cable holding portions 12 includes a flexible portion 121 and a hard plate-like portion 122, wherein the flexible portion 121 is formed at a root part continuing to the base portion 11, and the hard plate-like portion 122 continues to the flexible portion 121. The flexible portion 121 can be bendingly deformed in the third direction R3. The hard plate-like portion 122 is higher than the flexible portion 121 in rigidity.

As shown in FIGS. 3 and 4, the base portion 11, the two cable holding portions 12, and the two engaging portions 13 are formed in a flat shape extending along one plane in the natural state. In this case, the cable fasteners 1 can be conveyed efficiently since a plurality of cable fasteners 1 can be stuck in compact. Furthermore, when such flat cable fasteners 1 are manufactured, the movement width of the molding die can be made small. This reduces the manufacturing cost. It is noted that through holes are formed in the base portion 11 so that after the molding, the die can be pulled out to leave the extension portions 102 of the fixing portions 10.

The flexible portions 121 are bent toward the support surface 1101 side of the base portion 11 such that the hard plate-like portions 122 are deformed to face the support surface 1101. This allows the base portion 11 and the cable holding portions 12 to be in an annular state surrounding the cable 8 wired on the support surface 1101 of the base portion 11.

In the present embodiment, the flexible portions 121 are formed like a sheet that is thinner than the base portion 11 and the hard plate-like portion 122 in thickness. With this configuration, the flexible portions 121 can be bendingly deformed with ease in the third direction R3.

The engaging portions 13 respectively continue to the hard plate-like portions 122. Each of the engaging portions 13 includes a stem portion 131, a claw portion 132, a claw tip portion 133, and an engagement projection portion 135. The stem portions 131, the claw portions 132, the claw tip portions 133, and the engagement projection portions 135 of the two engaging portions 13 are respectively disposed to be opposite to each other with respect to a reference line L0 that extends along the first direction R1, when viewed from the support surface 1101 side of the base portion 11.

In the example shown in FIGS. 3 and 4, the reference point P0 is the center point of the base portion 11, and the reference line L0 passes through the reference point P0. In addition, the stem portions 131, claw portions 132, claw tip portions 133, and engagement projection portions 135 of the two engaging portions 13 are arranged point symmetrically with respect to the reference point P0 when viewed from the support surface 1101 side of the base portion 11.

The stem portions 131 respectively continue to the cable holding portions 12. Each of the stem portion 131 is formed on one side of the reference line L0 when viewed from the support surface 1101 side of the base portion 11. In the example shown in FIGS. 3 and 4, the stem portions 131 are formed like plates that extend from the hard plate-like portions 122 respectively.

Each of the claw portions 132 is formed to extend into the other side of the reference line L0 from the stem portion 131. A recessed portion 134 that is opened on the reference line L0 side is formed in a region that extends from the hard plate-like portion 122 of the cable holding portions 12, the region including the stem portion 131 and the claw portion 132 of the engaging portions 13.

Each of the claw tip portions 133 is a portion formed to extend from the claw portion 132 toward the cable holding portion 12 side. The engagement projection portion 135 is a projection projecting from a surface of the stem portion 131 on the attachment surface 1102 side of the base portion 11. When two engaging portions 13 are engaged with each other, the engagement projection portion 135 of one engaging portion 13 is hooked on the claw tip portion 133 of the other engaging portion 13.

It is noted that in the example shown in FIG. 3, reinforcing ribs 123 are formed on a surface of the hard plate-like portion 122 on the support surface 1101 side of the base portion 11, ridgelines of the reinforcing ribs 123 extending along the second direction R2.

Method for Fixing Cable by Cable Fasteners

Figure 6:
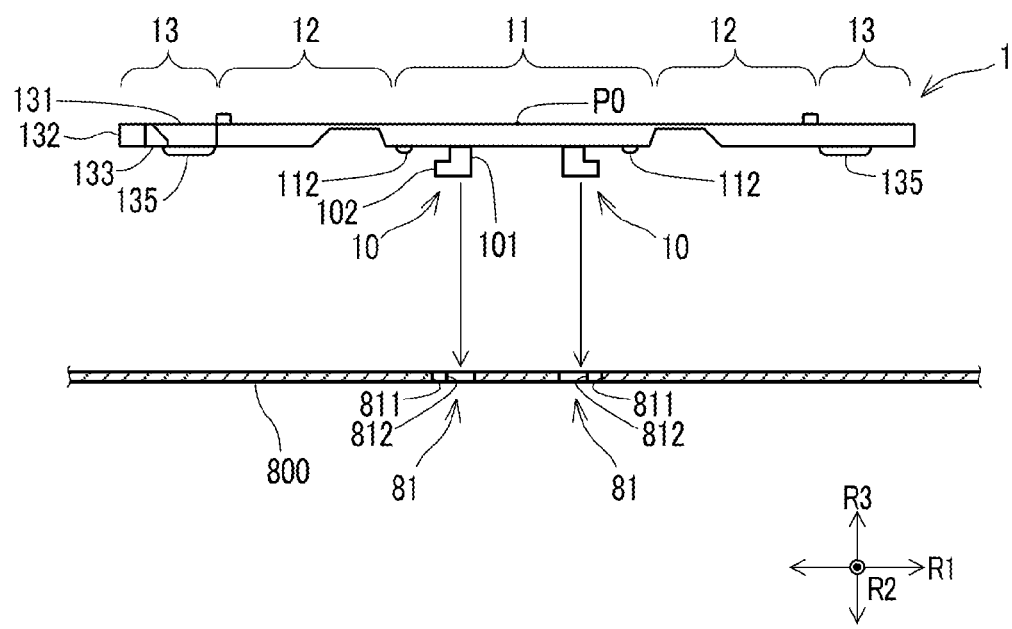
FIG. 6 is a front view of the cable fastener according to an embodiment of the present disclosure before attachment thereof to a plate-like support portion.
Figure 7:
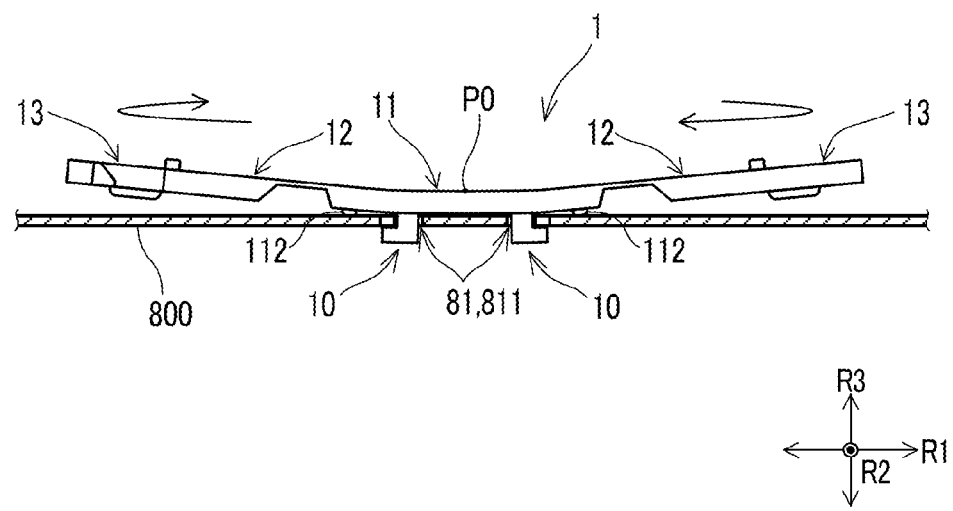
FIG. 7 is a front view of the cable fastener according to an embodiment of the present disclosure in the middle of attachment to the plate-like support portion.

Next, the method for fixing the cable 8 by the cable fasteners 1 is described with reference to FIGS. 6-10. First, as shown in FIGS. 6 and 7, the fixing portions 10 are respectively inserted into the large-width hole portions 811 of the attachment holes 81 of the plate-like support portion 800. At this time, the base portion 11 is pressed against the plate-like support portion 800 so that the whole extension portions 102 of the fixing portions 10 appear on the rear side of the plate-like support portion 800.

As shown in FIG. 7, when the base portion 11 is pressed against the plate-like support portion 800, the fitting projection portions 112 formed on the attachment surface 1102 of the base portion 11 contact the plate-like support portion 800. As a result, the base portion 11 is slightly bent.

Subsequently, a turning force is applied to the two engaging portions 13 or to portions that respectively include the two cable holding portions 12 and the two engaging portions 13. This allows the base portion 11 to rotate around the reference point P0 along the plate-like support portion 800. The base portion 11 is rotated until the fitting projection portions 112 reach the fitting holes 82 of the plate-like support portion 800.

Figure 8:
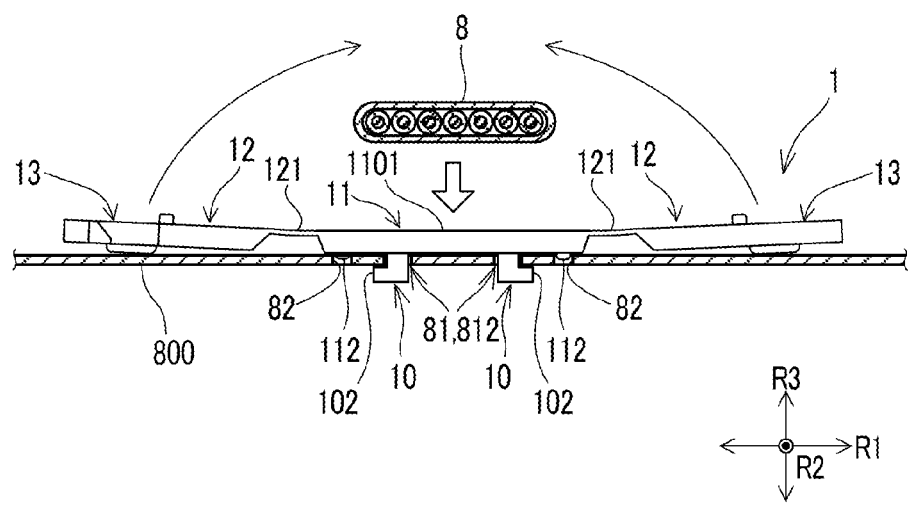
FIG. 8 is a front view of the cable fastener according to an embodiment of the present disclosure before holding a cable.

When the base portion 11 is rotated along the plate-like support portion 800, the fixing portions 10 pivot from the large-width hole portions 811 of the attachment holes 81 to the small-width hole portions 812. The fitting projection portions 112 are then fitted in the fitting holes 82 of the plate-like support portion 800. FIG. 8 shows a state after the base portion 11 was rotated until the fitting projection portions 112 reached the fitting holes 82 of the plate-like support portion 800.

For the fixing portions 10 to pivot smoothly from the large-width hole portions 811 of the attachment holes 81 to the small-width hole portions 812, the side surfaces of the extension portions 102 of the fixing portions 10 in the pivoting direction are formed as tapered surfaces 103 (see FIG. 4).

When the base portion 11 is rotated by operating the engaging portions 13 or the cable holding portions 12, the edge portions of the attachment holes 81 are sandwiched between the extension portions 102 of the fixing portions 10 and the base portion 11, thereby the base portion 11 is fixed to the plate-like support portion 800.

In addition, when the fitting projection portions 112 are fitted in the fitting holes 82 of the plate-like support portion 800, the base portion 11 that has been slightly bent returns to the former state. This prevents the cable fasteners 1 from removing from the plate-like support portion 800 by rotating in a reverse direction to a rotation direction of the attachment.

When the base portion 11 is fixed to the plate-like support portion 800, the cable 8 is wired along the support surface 1101 of the base portion 11, and the two cable holding portions 12 are bent toward the support surface 1101 side. The two engaging portions 13 are then engaged with each other. With the engagement of the engaging portions 13, the base portion 11 and the two cable holding portions 12 are kept to be in an annular state surrounding the cable 8. The cable 8 is held between the base portion 11 and the two cable holding portions 12.

Figure 9:
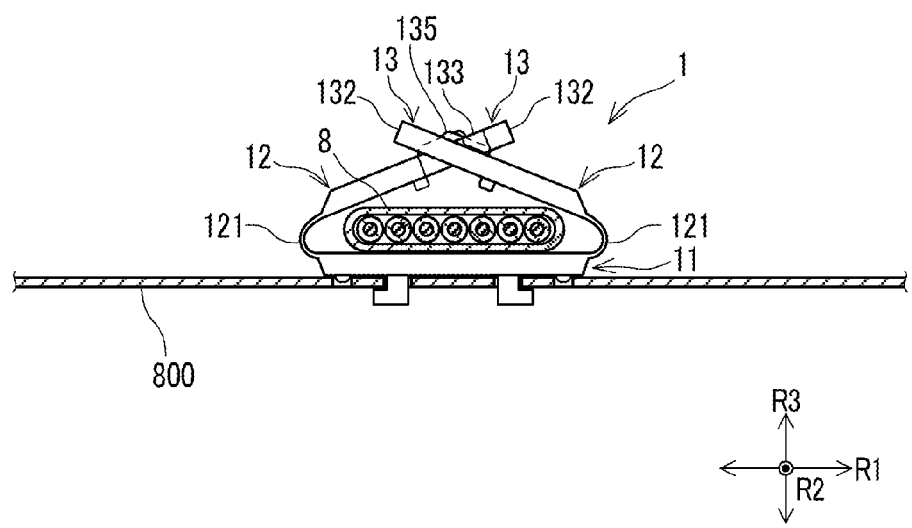
FIG. 9 is a front view of the cable fastener according to an embodiment of the present disclosure in a state of holding a cable.
Figure 10:
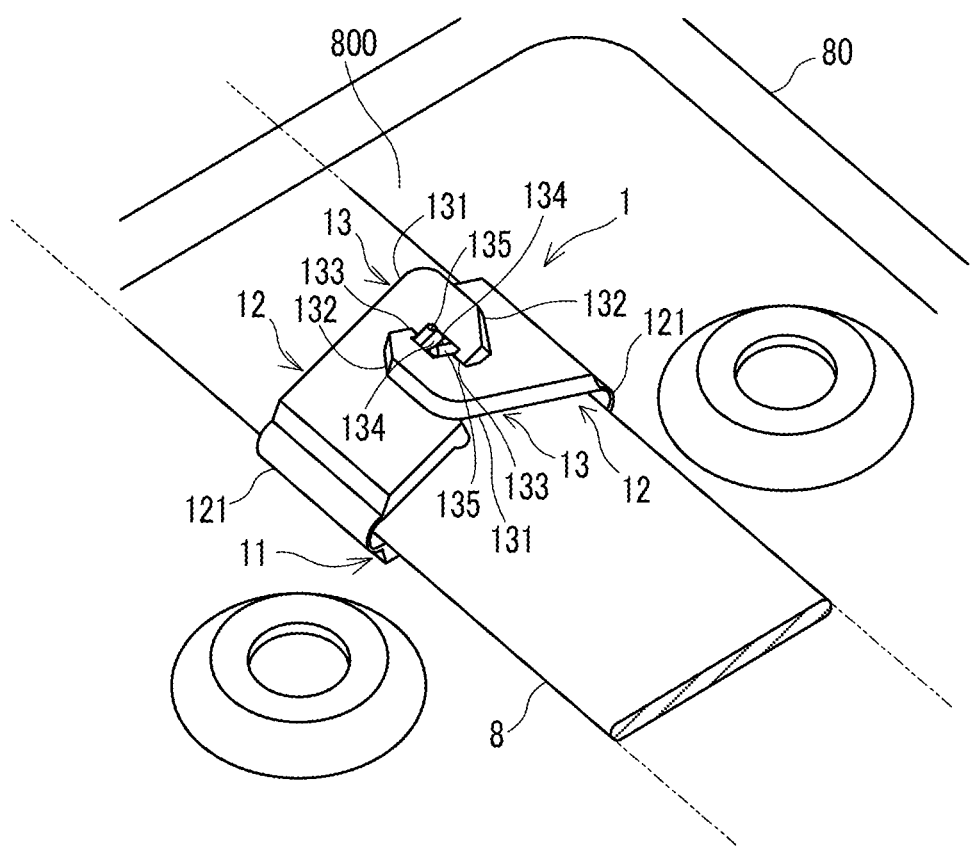
FIG. 10 is a perspective view of the cable fastener according to an embodiment of the present disclosure in a state of holding a cable.

FIGS. 9 and 10 show a state where the two engaging portions 13 are engaged with each other and thereby the base portion 11 and the two cable holding portions 12 are kept to be in an annular state. As shown in FIG. 10, the two engaging portions 13 are pulled together until the claw tip portion 133 of each engaging portion 13 climbs over the engagement projection portion 135 of the other engaging portion 13, and the recessed portions 134 mesh with each other.

In the state where the two engaging portions 13 are engaged with each other, the claw tip portion 133 of each engaging portion 13 is hooked on the engagement projection portion 135 of the other engaging portion 13. With this configuration, the state where the two engaging portions 13 are engaged with each other is kept more strongly.

In the present embodiment, each of the cable holding portions 12 includes the flexible portion 121 at one place that continues to the base portion 11. As a result, the base portion 11 and the two cable holding portions 12 form, on an inner side thereof, a wiring space that is approximately triangular.

By applying a torque to the two engaging portions 13 that are relatively away from the reference point P0, the cable fasteners 1 are attached to the plate-like support portion 800. As a result, in the case where the base portion 11 and the fixing portions 10 having high rigidity are adopted so as to increase the holding force of the cable fasteners 1, it is possible to rotate, with a relatively weak force, the base portion 11 that has slightly been deformed elastically.

In the cable fasteners 1, the length from the reference point P0 to an end of an engaging portion 13 exceeds twice the length from the reference point P0 to an end of the base portion 11 in the first direction R1. For example, in the example shown in FIGS. 3, 4 and 6, the length from the reference point P0 to an end of an engaging portion 13 is approximately thrice the length from the reference point P0 to an end of the base portion 11 in the first direction R1. In this case, by operating the end portions of the engaging portions 13, it is possible to rotate the cable fasteners 1 by a force that is less than one third of the force for operating the base portion 11 itself.

As a result, even in the case where the holding force of the cable fasteners 1 against the plate-like support portion 800 is desired to be increased, the load required for attaching the cable fasteners 1 to the plate-like support portion 800 is reduced. As a result, it is possible to provide the cable fasteners 1 that can be attached with an excellent workability.

On the other hand, in the state where the cable 8 is held by the cable fasteners 1, the portions respectively including the cable holding portions 12 and the engaging portions 13 are bent toward the base portion 11. As a result, the cable fasteners 1 can be relatively small in the state of holding the cable 8.

In addition, with a configuration where the portions of the cable fastener 1 respectively including the cable holding portions 12 and the engaging portions 13 have approximately the same length in the first direction R1, the cable fastener 1 can easily be rotated during the attachment process.

In addition, in the work of attaching the cable fasteners 1 to the plate-like support portion 800, there is no need to grip the cable fasteners 1 or the cable holding portions 12. As a result, as shown in FIGS. 3, 4 and 6, it is possible to make the base portion 11, the two cable holding portions 12, and the two engaging portions 13 plate-like, and adopt a configuration where they are formed in a flat shape extending along one plane.

As a result, with the adoption of the cable fasteners 1, it is possible to reduce the load required to attach the cable fasteners to the plate-like support portion 800, and realize the cable fasteners that have a strong holding force against the plate-like support portion 800 and have a short height. This enables the cable fasteners 1 to be stored easily in a limited space.

For example, when the cable 8 such as a flat cable is to be fixed in a narrow gap formed in the boundary region between the two optical scanning portions 51 in the image forming apparatus 100, the cable fasteners 1 are suitably adopted.

In addition, in the state where the cable 8 is held by the cable fasteners 1, an external force applied to the cable 8 acts on the base portion 11 via the cable holding portions 12. Thus, if, in the base portion 11, the distance from a fixing portion 10 to a cable holding portion 12 that is adjacent to the fixing portion 10 is long, the base portion 11 is likely to be deformed by the external force applied to the cable 8.

In the cable fasteners 1, the two fixing portions 10 are projections projecting from the attachment surface 1102 of the base portion 11 at positions close to the two cable holding portions 12 respectively. In this case, in the base portion 11, the distance from a fixing portion 10 to a cable holding portion 12 that is adjacent to the fixing portion 10 is short. As a result, the base portion 11 is difficult to be deformed by an external force applied to the cable 8.

As a result, with the adoption of the cable fasteners 1, it is possible to reduce the thickness and weight of the base portion 11, and reduce the amount of deformation of the base portion 11 by an external force applied to the cable 8.

APPLICATION EXAMPLES

In each of the cable fasteners 1, only one fixing portion 10 may be disposed at the reference point P0 on the attachment surface 1102 of the base portion 11.

In addition, in the cable fasteners 1, a plurality of holes or dents may be formed in the flexible portion 121 so that the flexible portion 121 can be bendingly deformed. In addition, the base portion 11 may be provided with lattice-shaped reinforcing ribs.

It is noted that the cable fastener and the image forming apparatus of the present disclosure may be configured by freely combining, within the scope of claims, the above-described embodiments and application examples, or by modifying the embodiments and application examples or omitting a part thereof.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A cable fastener comprising:
a base portion having a first surface for supporting a cable;
two fixing portions that are projections projecting from a second surface of the base portion that is opposite to the first surface;
two cable holding portions extending from the base portion toward opposite sides of the base portion along a first direction; and
two engaging portions integrally connected to the two cable holding portions respectively from sides opposite to the base portion; wherein
the fixing portions are configured to, when the fixing portions are respectively inserted into two holes of a plate-like support portion and then the base portion is rotated around a predetermined reference point, fix the base portion to the plate-like support portion in a state where an edge portion of the holes of the plate-like support portion is sandwiched between the fixing portions and the base portion;
the two cable holding portions are configured to be bendingly deformed toward the first surface of the base portion;
the two engaging portions are configured to be engaged with each other such that the base portion and the two cable holding portions are kept to be in an annular state;
the base portion is formed like a plate;
the base portion, the two cable holding portions, and the two engaging portions are formed in a flat shape extending alone one plane in a natural state;
each of the two cable holding portions includes: a flexible portion that can be bendingly deformed; and a hard plate-like portion that integrally connects to the flexible portion;
the flexible portion has been formed at least at a root part that integrally connects to the base portion and is formed like a sheet that is thinner than the base portion and the hard plate-like portion in thickness; and
the hard plate-like portion is higher than the flexible portion in rigidity; and
wherein each of the two engaging portions includes:
a stem portion integrally connected to one of the two cable holding portions and formed on one side of a reference line when viewed from a side of the first surface of the base portion, the reference line extending along the first direction;
a claw portion extending from the stem portion into the other side of the reference line;
a claw tip portion extending from the claw portion toward a cable holding portion side; and
a projection portion extending along the first direction and projecting from a surface of the stem portion on a side of the second surface of the base portion, and configured to be hooked on a claw tip portion of the other engaging portion; and wherein
the stem portions, the claw portions, the claw tip portions, and the projection portions of the two engaging portions are respectively disposed to be opposite to each other with respect to the reference line.

2. The cable fastener according to claim 1, wherein two portions that are each composed of one of the two cable holding portions and one of the two engaging portions integrally connected to each other have approximately a same length in the first direction.

3. An image forming apparatus comprising:
a photoconductor;
at least one optical scanning portion configured to write an electrostatic latent image on the photoconductor by scanning the photoconductor with a laser beam;
a developing portion configured to develop the electrostatic latent image by supplying developer to the photoconductor;
the cable fastener according to claim 1;
the plate-like support portion having the two holes into which the two fixing portions of the cable fastener are inserted such that the base portion of the cable fastener is fixed to the plate-like support portion; and
a cable held between the base portion and the two cable holding portions of the cable fastener.

4. The image forming apparatus according to claim 3, wherein
the cable is a flat cable.

5. The image forming apparatus according to claim 3, wherein
the at least one optical scanning portion is two optical scanning portions, and
the plate-like support portion is opposed to a gap that is formed in a boundary region between the two optical scanning portions that are arranged side by side on a support body that supports the two optical scanning portions.

6. The cable fastener according to claim 1, wherein
the hard plate-like portion includes a reinforcing rib which projects from a surface in an end portion thereof close to one of the two engaging portions on the first surface side of the base portion such that a ridgeline of the reinforcing rib extends along a direction perpendicular to the first direction.

* * * * *